A. Y. DAVIS.
GRIP NUT.
APPLICATION FILED FEB. 8, 1909.
921,369.  Patented May 11, 1909.
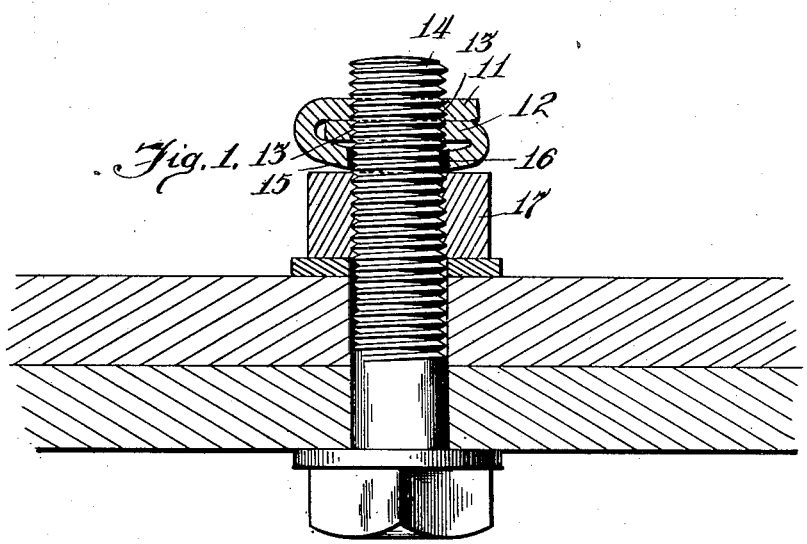
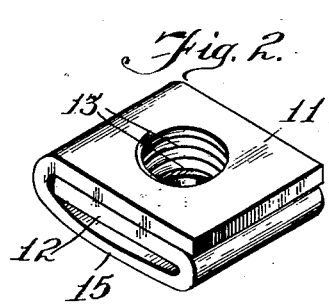
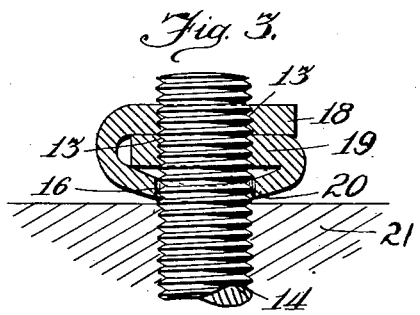
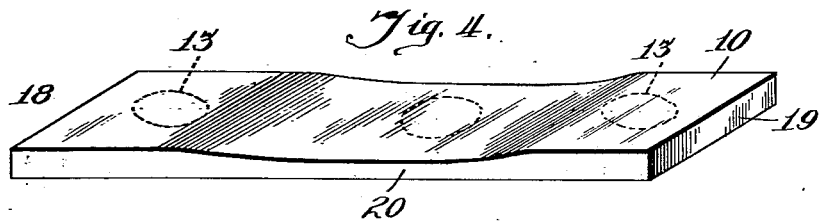
Witnesses
Milton Lenoir
E. M. Klatcher
Inventor
Alpha Y. Davis.
By Gillson & Gillson
Attorneys.

UNITED STATES PATENT OFFICE.

ALPHA Y. DAVIS, OF TOPEKA, KANSAS.

GRIP-NUT.

No. 921,369.   Specification of Letters Patent.   Patented May 11, 1909.

Application filed February 8, 1909. Serial No. 476,804.

*To all whom it may concern:*

Be it known that I, ALPHA Y. DAVIS, a citizen of the United States, and resident of Topeka, county of Shawnee, and State of Kansas, have invented certain new and useful Improvements in Grip-Nuts, of which the following is a specification, and which are illustrated in the accompanying drawings, forming a part thereof.

The invention relates to that class of threaded nuts which include means, in addition to the thread, for gripping the bolt to which the nut is applied; and its object is to provide improved means for securing a firm grip whereby the nut is effectually held from accidental release.

The invention is exemplified in the structure hereinafter described, and which is illustrated in the accompanying drawings, in which—

Figure 1 is a sectional view of a pair of plates bolted together, the nuts and washer applied to the bolt being shown in section; Fig. 2 is a perspective of the improved grip nut as shown in Fig. 1; Fig. 3 is a sectional view of the grip nut as applied to a bolt, and showing a modified form of construction; and Fig. 4 is a perspective of the blank from which the nut shown in Fig. 3 is formed.

The improved grip nut is formed of a metal plate 10, having its ends folded over upon its body portion and overlapping, the body portion being bowed outwardly while the two end portions remain flat and have the faces of their overlapping portions in contact. The three sections of plate are apertured so that after folding the axes of the several apertures are in alinement. The apertures in the end portions are threaded to engage the bolt to which the nut is to be applied, while the aperture in the body portion is unthreaded and is of such size that the bolt may slide freely through it.

In the construction shown in Figs. 1 and 2, the plate of which the grip nut is formed is of uniform thickness throughout. Its flattened end portions are designated, respectively, 11 and 12, and each is provided with a threaded aperture, as shown at 13, for engaging the bolt 14. The outwardly-bowed central portion of the plate is designated 15, and its aperture 16 is unthreaded and is of such size that the bolt 14 may pass freely through it. As illustrated in Fig. 1 the grip nut is applied in place of an ordinary jam nut, following the threaded nut 17 which is relied upon for drawing up the bolt 14.

In the construction illustrated in Figs. 3 and 4, the grip nut has its end portions 18, 19, thickened to provide more stock within which to form the threads in its bolt-receiving apertures, its body portion 20 being somewhat thinner than the end portions in order that it may be more easily flexed. This form of construction is preferable when the grip nut is used as a substitute for means for securing the nut 17.

A wrench may be applied to the improved nut, as to an ordinary nut, as, when in its completed form, it is square. In applying the nut its bowed face is inward, and as it is screwed up against the outer face of a nut, as 17, or against the outer face of the member, as 21, to be secured, this bowed portion is compressed and flattened, producing an outward strain at its ends which is transmitted to the two threaded portions, drawing each backwardly and binding that portion of its thread adjacent its outer edge firmly against the bolt. This grip upon the opposite sides of the bolt increases as the nut is screwed up and effectually prevents an accidental loosening of the threaded engagement. The strain incident to the straightening of the bowed portion of the nut is not only longitudinally but outwardly in a direction parallel to the bolt, thereby tending to tilt the threaded sections and thus still more effectually gripping the bolt. This latter strain acts upon each of the threaded sections independently of the other. That is to say, it would cause the section 12 to grip the bolt if the section 11 were not present.

Instead of having both ends of the plate 10 thickened, as shown, it may be found desirable in some instances to thicken but one end. The straining action can be obtained by threading only the outer end, but this practice is undesirable for the reason that an unthreaded wall, if pressed against the thread of the bolt, would tend to mar it.

I claim as my invention—

1. A grip nut comprising, in combination, a pair of overlapping flattened sections having alined threaded apertures, and an outwardly bowed intermediate section having its ends connected, respectively, to the two flattened sections, such bowed section having an aperture in alinement with the threaded apertures of the other two sections.

2. A grip nut comprising, in combination, a pair of overlapping flattened sections having alined threaded apertures, and an outwardly bowed intermediate section having its ends connected, respectively, to the two flattened sections, the bowed section having an aperture in alinement with and of greater diameter than the threaded apertures.

3. A grip nut formed of a metal plate folded into three sections, the outer sections being overlapped and the intermediate section being outwardly bowed, the three sections being apertured in alinement, the apertures of the end sections being threaded.

4. A grip nut formed of a plate having its ends thicker than its central section and being so folded that its end sections overlap and its intermediate section is bowed, the three sections being apertured in alinement and the apertures of the end sections being threaded.

5. A grip nut formed of a plate folded into three sections, the outer sections being overlapped and the inner section being bowed, one of the outer sections being thicker than the bowed sections, the other sections being apertured in alinement, the apertures of the end sections being threaded.

ALPHA Y. DAVIS.

Witnesses:
Louis K. Gillson,
E. M. Klatcher.